(12) United States Patent
Chew et al.

(10) Patent No.: US 12,073,292 B2
(45) Date of Patent: Aug. 27, 2024

(54) ASSESSING ACCURACY OF A MACHINE LEARNING MODEL

(71) Applicant: Google LLC, Mountain View, CA (US)

(72) Inventors: Sue Yi Chew, Daly City, CA (US); Deepak Ramamurthi Sivaramapuram Chandrasekaran, San Jose, CA (US); Bo Fu, Mountain View, CA (US); Prachi Gupta, Los Altos, CA (US); Kunal Jain, San Bruno, CA (US); Thomas Price, San Francisco, CA (US); Sarvjeet Singh, Palo Alto, CA (US); Jierui Xie, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 872 days.

(21) Appl. No.: 16/322,433

(22) PCT Filed: Jan. 24, 2017

(86) PCT No.: PCT/US2017/014783
§ 371 (c)(1),
(2) Date: Jan. 31, 2019

(87) PCT Pub. No.: WO2018/125264
PCT Pub. Date: Jul. 5, 2018

(65) Prior Publication Data
US 2019/0311287 A1 Oct. 10, 2019

Related U.S. Application Data

(60) Provisional application No. 62/440,774, filed on Dec. 30, 2016.

(51) Int. Cl.
*G06N 20/00* (2019.01)
*G06F 11/34* (2006.01)
(Continued)

(52) U.S. Cl.
CPC ......... *G06N 20/00* (2019.01); *G06F 11/3495* (2013.01); *G06N 7/00* (2013.01); *G06Q 10/04* (2013.01); *G06Q 30/0202* (2013.01)

(58) Field of Classification Search
CPC ...... G06N 20/00; G06N 7/00; G06F 11/3495; G06Q 10/04; G06Q 30/0202
(Continued)

(56) References Cited

U.S. PATENT DOCUMENTS

2018/0108046 A1* 4/2018 Randazzo .......... G06Q 30/0244

FOREIGN PATENT DOCUMENTS

| DE | 212017000012 U1 * | 4/2018 | .......... G06F 11/3495 |
| WO | WO-2012/151198 A1 | 11/2012 | |

(Continued)

OTHER PUBLICATIONS

Expert commentator, How to reach your audience through targeted content distribution, 2015 (Year: 2015).*
(Continued)

*Primary Examiner* — Tarek Elchanti
(74) *Attorney, Agent, or Firm* — MARSHALL, GERSTEIN & BORUN LLP

(57) ABSTRACT

Balancing content distribution between a machine learning model and a statistical model provides a baseline assurance in combination with the benefits of a well-trained machine learning model for content selection. In some implementations, a server receiving requests for a content item assigns a first proportion of the received requests to a first group and assigns remaining requests to a second group. The server uses a machine learning model to select variations of the requested content item for responding to requests assigned to the first group and uses a statistical model to select content variations for requests assigned to the second group. The server obtains performance information, e.g., acceptance (Continued)

rates for the different variations, and compares performance of the different models used for content selection. Audience share assigned to the machine learning model is increased when it outperforms the statistical model and decreased when it underperforms the statistical model.

18 Claims, 5 Drawing Sheets

(51) Int. Cl.
   *G06N 7/00* (2023.01)
   *G06Q 10/04* (2023.01)
   *G06Q 30/0202* (2023.01)

(58) Field of Classification Search
   USPC .......................................................... 706/12
   See application file for complete search history.

(56) References Cited

FOREIGN PATENT DOCUMENTS

WO    WO-2015/084641 A1    6/2015
WO    WO-2016/061283 A1    4/2016

OTHER PUBLICATIONS

Pinterest, A machine learning model to determine the accuracy of variant calls in capture-based next generation sequencing, 2018 (Year: 2018).*

International Preliminary Report on Patentability on Appln. Ser. No. PCT/US2017/014783 dated Jul. 11, 2019 (11 pages).

International Search Report and Written Opinion on Appln. Ser. No. PCT/US2017/014783 dated Apr. 18, 2017 (17 pages).

First Office Action for CN Appln. Ser. No. 201780002012.X dated Jun. 24, 2021 (30 pages).

Examination Report for EP Appln. Ser. No. 17705212.3 dated May 20, 2020 (10 pages).

* cited by examiner

ASSESSING ACCURACY OF A MACHINE LEARNING MODEL

CROSS REFERENCES TO RELATED APPLICATIONS

This application is a National Stage Application under 35 U.S.C. § 371 of International Patent Application No. PCT/US2017/014783, filed Jan. 24, 2017, which claims the benefit of and priority to U.S. Patent Application No. 62/440,774, filed on Dec. 30, 2016, titled "ASSESSING ACCURACY OF A MACHINE LEARNING MODEL," each of which is hereby incorporated by reference herein in its entirety.

BACKGROUND

Machine learning models can be used in a variety of industries. With the rapid growth of connected devices that autonomously sense environmental conditions and make decisions, machine learning systems are becoming more and more prevalent. Ensuring the accuracy of a machine learning model is paramount as results generated from an inaccurate machine learning models can result in incorrect decisions, which when deployed in certain scenarios, can adversely affect the performance of the system that deployed the machine learning model.

SUMMARY

Determinations and recommendations generated by a computing system using a machine learning model may tend towards measurably better or worse determinations and recommendations than those generated by a computing system using a statistical model. As described herein, the statistical model provides a baseline assurance that the machine learning model is not progressing away from quality determinations and recommendations.

In some implementations, a server receiving data requests assigns a first proportion of the received requests to a first group and assigns a second proportion of requests to a second group. The server uses a machine learning model to select responses to the requests assigned to the first group and uses a statistical model to select responses to requests assigned to the second group. The server obtains feedback information indicating a performance level of each model based on the responses respectively selected and compares an aggregate performance level of the machine learning model to an aggregate performance level of the statistical model, each aggregate performance level determined used the corresponding feedback information. Feedback information may include, for example, whether each response was objectively or subjectively satisfactory to a respective response recipient, whether the response was rejected as indicated by less than a minimum threshold length of time before a subsequent request, whether data within a response was utilized or acted upon, and if so whether the utilization satisfied measurable criteria. In some implementations, the proportion of requests that are assigned to the first group and the proportion of requests that are assigned to the second group may be changed based on the result of comparing the aggregate performance level of the machine learning model to the aggregate performance level of the statistical model. For example, when the comparison indicates that the aggregate performance level of the machine learning model is below a benchmark threshold, then the server reduces the first proportion of requests assigned to the first group. In some implementations, the benchmark threshold is based on or equal to the aggregate performance level of the statistical model. In some implementations, when the comparison indicates that the aggregate performance level of the machine learning model is above a benchmark threshold by at least a gap threshold, the server increases the first proportion of requests assigned to the first group. In some implementations, the requests are for content.

Balancing content distribution between a machine learning model and a statistical model provides a baseline assurance in combination with the benefits of a well-trained machine learning model for content selection. In some implementations, a server receiving requests for a content item assigns a first proportion of the received requests to a first group and assigns remaining requests to a second group. The server uses a machine learning model to select variations of the requested content item for responding to requests assigned to the first group and uses a statistical model to select content variations for requests assigned to the second group. The server obtains performance information, e.g., acceptance rates for the different variations, and compares performance of the different models used for content selection. Audience share assigned to the machine learning model is increased when it outperforms the statistical model and decreased when it underperforms the statistical model.

In at least one aspect, described is a method that includes receiving, by a data processing system including one or more physical servers, a first plurality of data requests including a first data request from a first client device and a second data request from a second client device. The method includes assigning, by the data processing system, the first data request to a first response pool selected by the data processing system from a plurality of response pools based on an allocation policy that allocates a first portion of the plurality of data requests to the first response pool and a second portion of the plurality of data requests to a second response pool, the first response pool corresponding to a machine learning model and the second response pool corresponding to a statistical model; and assigning, by the data processing system, the second data request to the second response pool selected by the data processing system from the plurality of response pools based on the allocation policy. The method includes responding, by the data processing system, to the first request with a first response selected by the data processing system using the machine learning model and responding to the second request with a second response selected by the data processing system using the statistical model. The method includes obtaining, by the data processing system from the first client device, first feedback information indicating a performance level of the machine learning model and obtaining, by the data processing system from the second client device, second feedback information indicating a performance level of the statistical model. The method includes comparing, by the data processing system, an aggregate performance level of the machine learning model determined using the first feedback information to an aggregate performance level of the statistical model determined using the second feedback information and updating the allocation policy responsive to the comparison. The method includes receiving a second plurality of data requests subsequent to updating the allocation policy and assigning, by the data processing system, a first subset of the second plurality of data requests to the first response pool and a second subset of the second plurality of data requests to the second response pool in accordance with the updated allocation policy.

In at least one aspect, described is a method of balancing content selection. The method includes receiving, by a content distribution server, a request from a client device for a content item, the content distribution server comprising a computing processor and an interface to a data network, the request received via the data network. The method includes assigning, by the content distribution server, the received request to an audience pool based on a distribution factor, the audience pool selected for assignment from a set of pool options including a first pool that receives content parameterized using a machine learning model and a second pool that receives content parameterized using a statistical model. The method includes selecting, by the content distribution server, a content variation responsive to the received request using a selection mode corresponding to the assigned audience pool and delivering the selected content variation to the client device via the data network. The method includes obtaining, by the content distribution server, an acceptance indicator representing user acceptance of the delivered content variation and updating the distribution factor, by the content distribution server, based on the obtained acceptance indicator and the assigned audience pool.

In at least one aspect, described is a system for balancing content selection. The system includes an interface to a data network, a computing processor, and a computer readable memory storing instructions executable by the computing processor. When executed, the stored instructions cause the computing processor to receive, from a client device via the interface to the data network, a request for a content item and to assign the received request to an audience pool based on a distribution factor, the audience pool selected for assignment from a set of pool options including a first pool that receives content parameterized using a machine learning model and a second pool that receives content parameterized using a statistical model. When executed, the stored instructions further cause the computing processor to select a content variation responsive to the received request using a selection mode corresponding to the assigned audience pool, deliver the selected content variation to the client device via the data network, obtain an acceptance indicator representing user acceptance of the delivered content variation, and update the distribution factor based on the obtained acceptance indicator and the assigned audience pool.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

Figure 1:
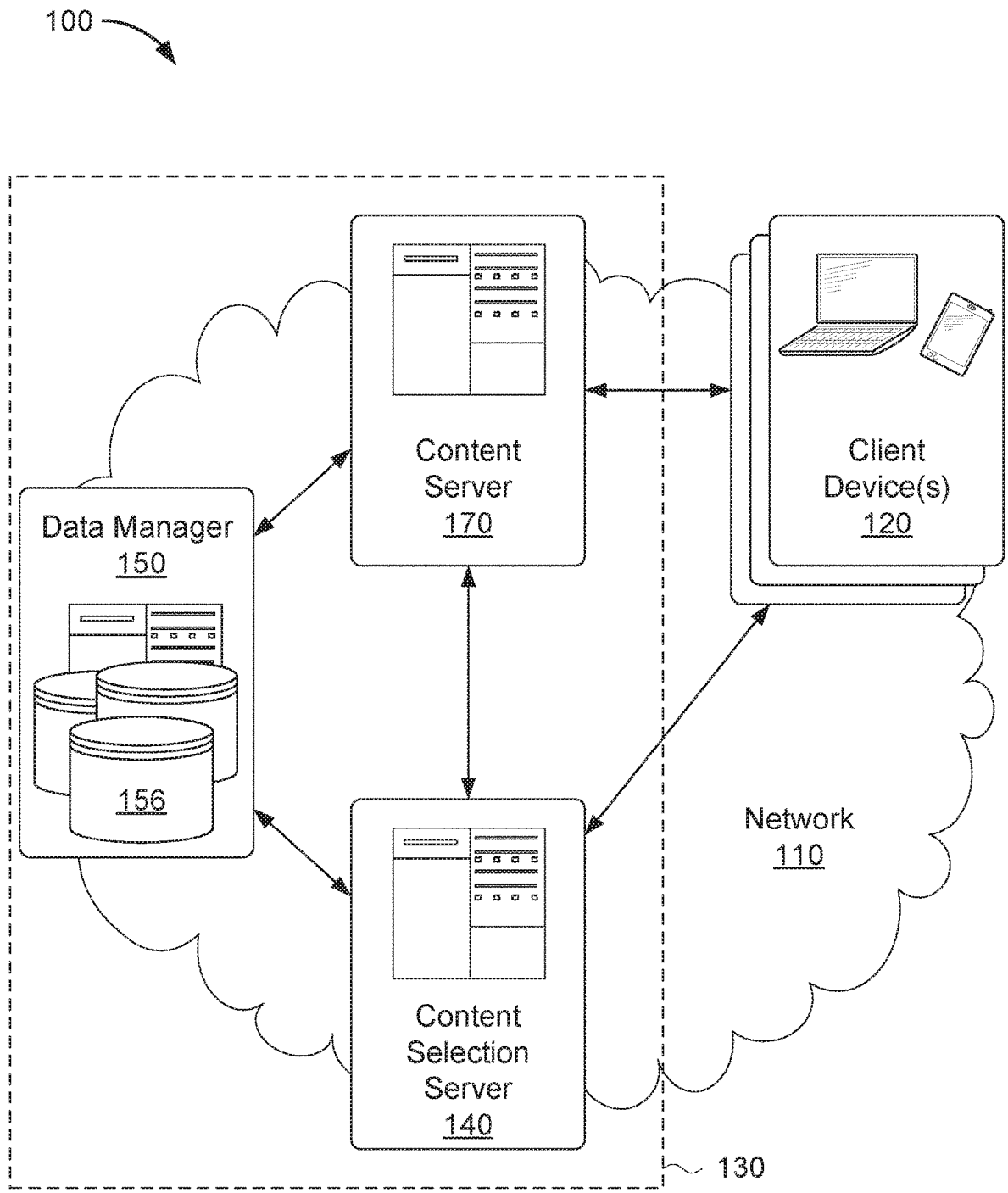
FIG. 1 is a diagram of an example distribution system in a network environment.

Following below are more detailed descriptions of various concepts related to, and implementations of, methods, apparatuses, and systems relating to assessing an accuracy of a machine learning model based on a comparison of respective performance results of the machine learning model and one or more statistical models. The various concepts introduced above and discussed in greater detail below may be implemented in any of numerous ways, as the described concepts are not limited to any particular manner of implementation.

In particular, the present disclosure relates to systems and methods for assessing accuracy of a machine learning model based on a comparison of respective performance results of the machine learning model and one or more statistical models. Machine learning systems rely on machine learning models that may, in some instances, be inaccurate or become inaccurate. For example, machine learning models may produce inaccurate results if the training data provided to the models is inaccurate. Other times, machine learning models may produce inaccurate results if the machine learning model accepts an incorrect result as a correct result. Since machine learning models are continuously learning, they may be prone to learn from incorrect results, which can adversely affect the accuracy of the machine learning model.

As described herein, machine learning models can be used in a variety of industries. Machine learning models are used, for example, to analyze large data sets, to make predictions or recommendations, and to identify patterns and anomalies. Machine learning models are used, for example, in image recognition (e.g., facial recognition, character recognition, and image matching systems), natural language processing and translation, traffic routing (including, but not limited to, vehicular and pedestrian traffic routing around temporary traffic obstructions such as accidents or road construction), connected devices (e.g., the "Internet of Things"), weather forecasts, election predictions, news and media sorting (e.g., identifying popular articles and connections between articles), entertainment recommendations (including, but not limited to, music recommendations, "next song" recommendations, television and movie recommendations, and so forth), channel preference predictions for pre-tuning a receiver to a channel such that when an attached presentation device is activated it is already tuned to the "right" channel, fraud detection (e.g., identifying fraudulent credit card transactions), bot detection, gatekeeping online resources, home automation and environmental controls, etc. With the rapid growth and deployment of such systems, machine learning systems are increasingly more prevalent.

Machine learning and machine learning models used in machine learning encompass a variety of machine learning techniques. Machine learning techniques may be considered to be supervised, unsupervised, or some combination thereof. Generally, a supervised machine learning system is used to build a model from training data where the desired output for the training data is already known. An unsupervised system, or a hybrid system, generates or extends the model without (or with limited) initial knowledge about desired outputs. Machine learning algorithms include, for example, classical neural networks, deep learning neural networks (such as the Deep Boltzmann Machine), k-Means clustering, and Classification and Regression Tree algorithms. In some implementations described herein, the machine learning model is a deep learning neural network initially trained on a supervised data set and then further trained unsupervised based on feedback information received responsive to output generated by the machine learning model based on real-world input data.

In some implementations, the machine learning model is used to select or modify content for delivery to client devices. Computing devices, including servers, desktops, laptops, and mobile devices such as "smart" telephones and tablets, can request and receive digital content over a data network. The devices receive content over the network and present the received content to users. For example, the content may be in the form of an electronic document, an "e-book," a web page (or a set of web pages forming a website), component elements of a web page (e.g., article content, blog content, third-party content, user generated content), an image or images, an audio file or audio stream, a video or multi-media presentation, an interactive media such as a streaming game, or any other form of content. In some instances, the users engage with the content, e.g., choosing to tap or click on particular content elements such as embedded links or interaction controls. Some content delivered to such computing devices is dynamically selected or generated by a content server such as a website host server. The content server may select from a catalog of static content. The content server may generate dynamic content from a set of input parameters, where one or more parameters may be selected at random, set based on data associated with an expected audience for the content, or user supplied. Content generated dynamically from a set of input parameters is parameterized content, which includes but is not limited to content generated from a template and content with modifiable characteristics such as font, font size, language, and color scheme.

Digital copy testing is the process of identifying the best variant of a content item to provide, where multiple variants of the content item are available. As an example, some websites are "adaptive websites" that adjust a website's structure, content, and/or appearance in response to one or more measured interactions with the site. For example, an adaptive website may have a variable presentation element such as a font size that a visitor can request to have increased or decreased. However, each time a visitor requests a change to a website, it may result in the content server resending content over the network, resulting in an increase in network traffic and a waste of network resources. Similar problems may arise with delivery of any data, e.g., responses to data requests, where the initial data tendered might be sub-optimal, resulting in additional requests that increase network traffic and waste network resources.

To avoid the network waste associated with retransmitting content, it is helpful to deliver content to a computing device that has been optimally selected and formatted for the intended audience, i.e., a user of the receiving computing device. One method of optimally selecting content relies on a machine learning model. However, this approach may be slow to converge and may, in some instances, diverge from the most optimal result. It can be difficult to detect when a machine learning model is on a divergent track, and it is desirable to have a technical solution for quickly recognizing when the machine learning model is working well and when it isn't. As explained above, the delivery of content (or data) is likely to be resource-inefficient if the machine learning model is not working well, and quickly recognizing when the machine learning model is not working well allows for corrective action, e.g., by a content provider or network administrator.

Figure 2:
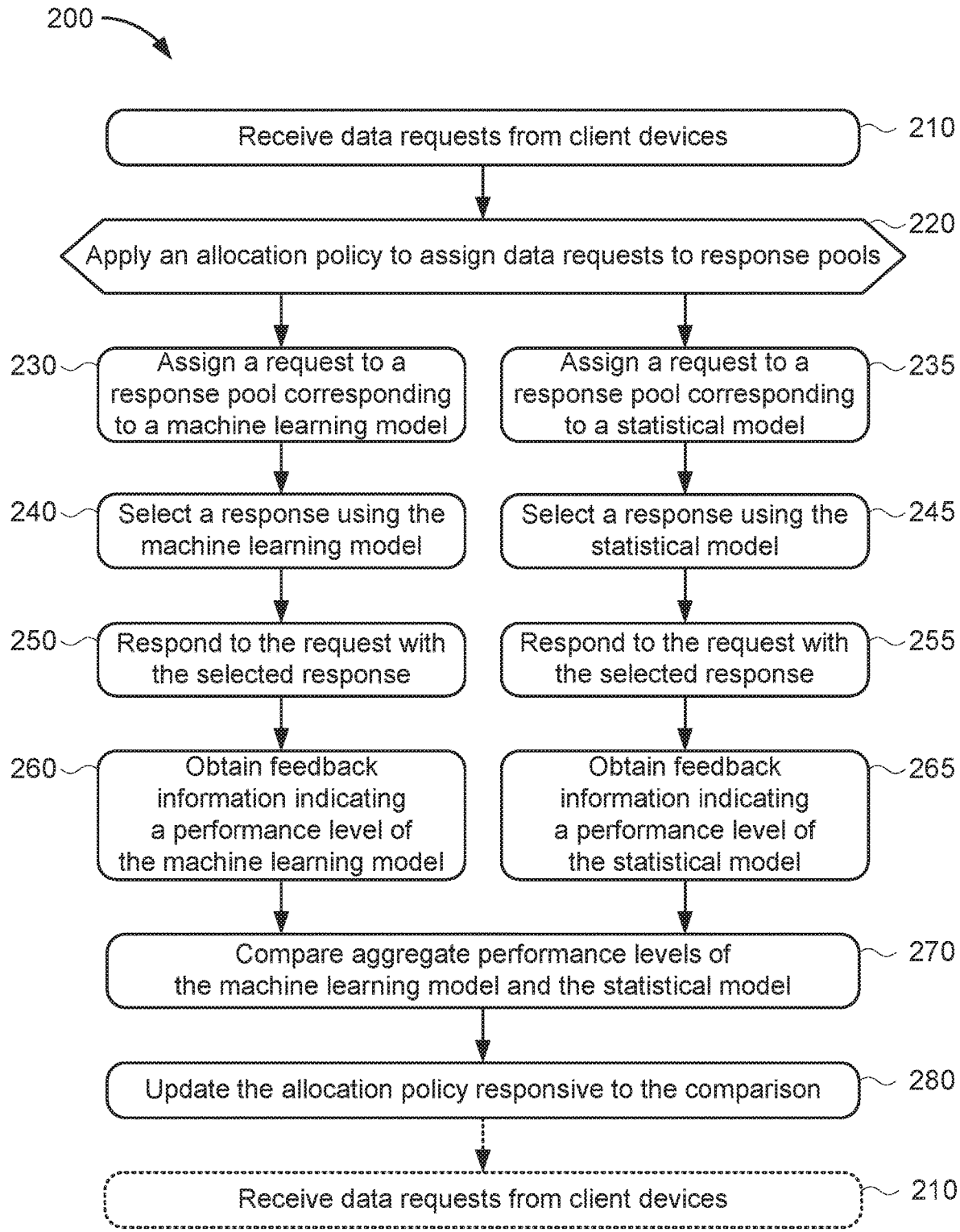
FIG. 2 is a flowchart of an example method for responding to data requests.
Figure 3A:
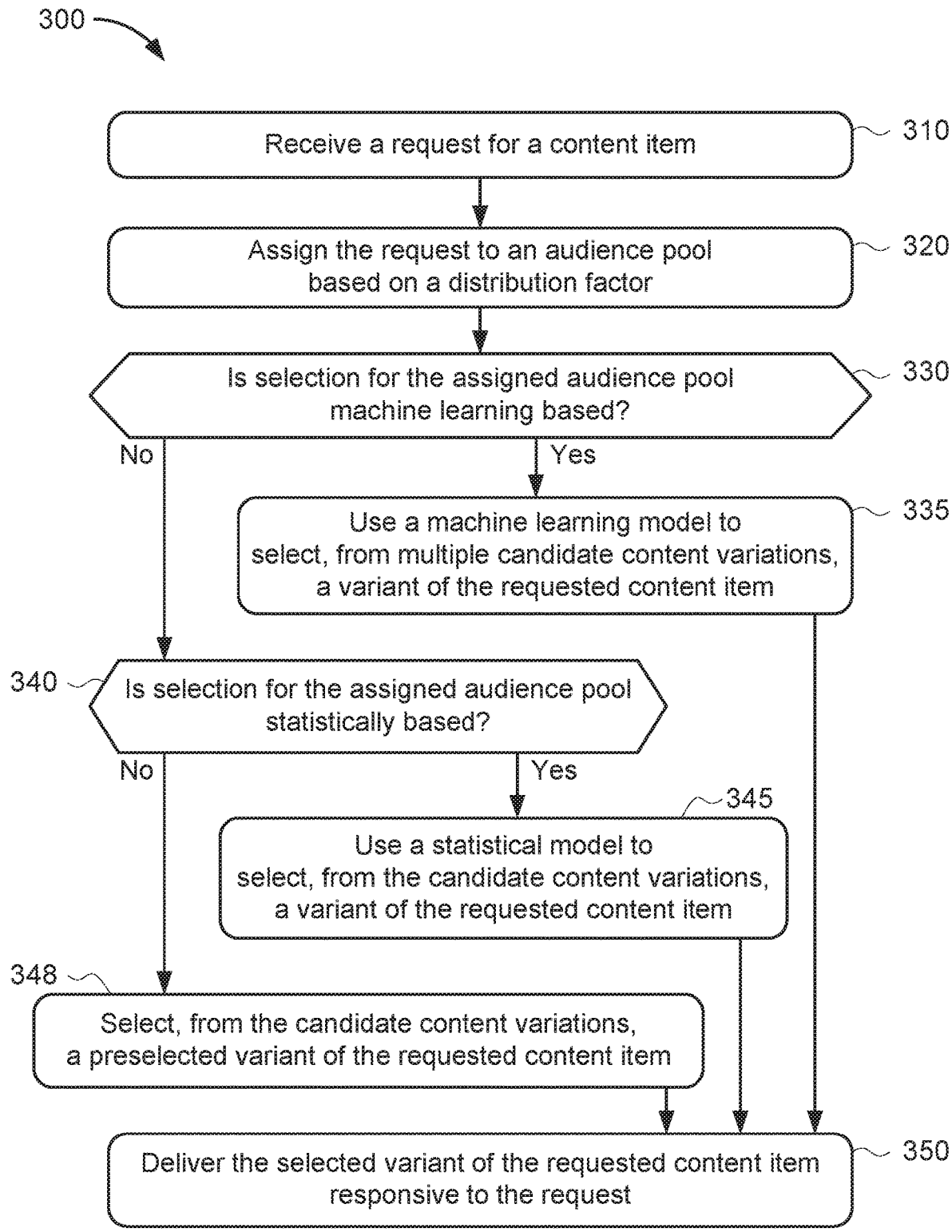
FIG. 3A is a flowchart of an example method for distributing content variations based on a distribution factor.
Figure 3B:
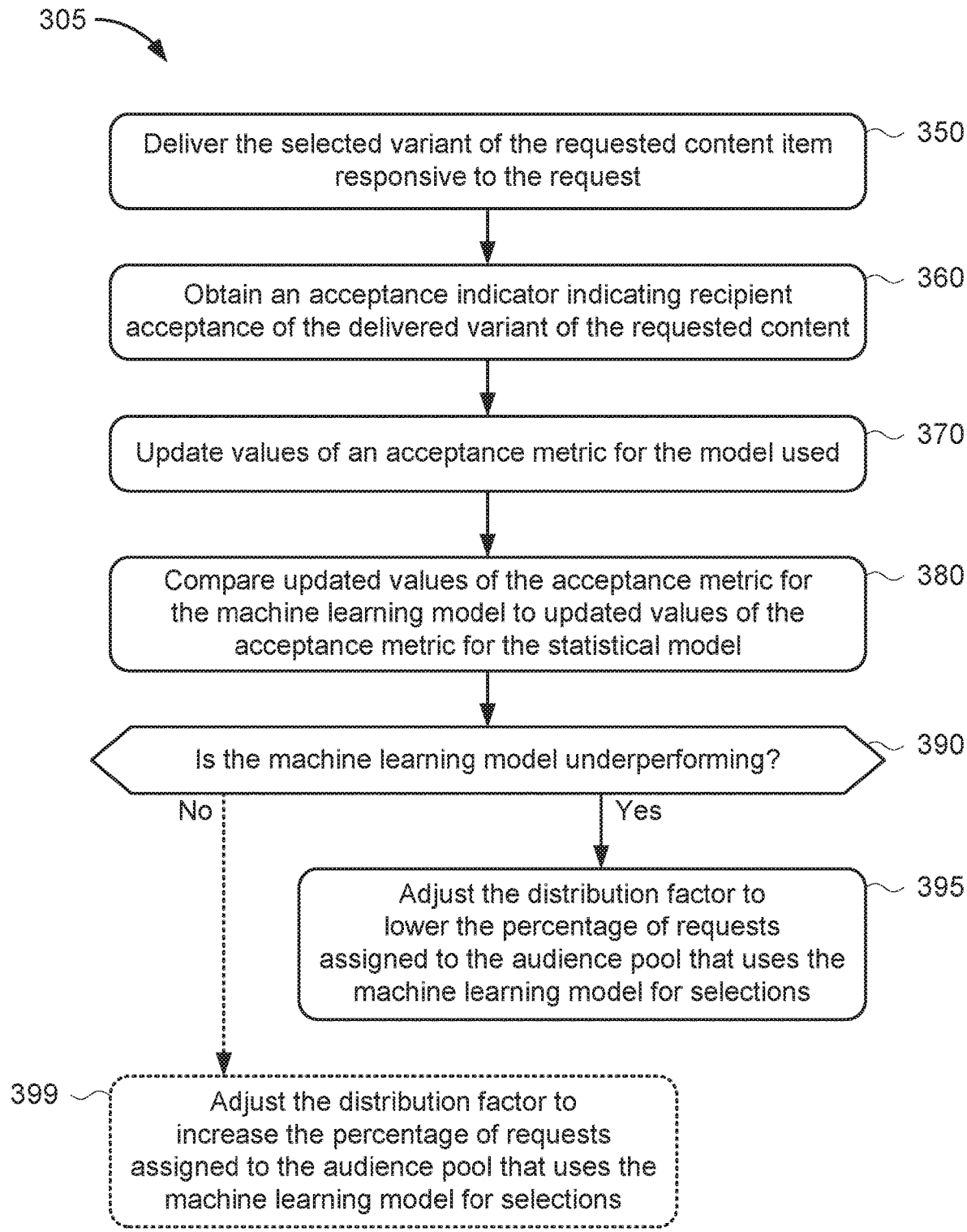
FIG. 3B is a flowchart of an example method for updating the distribution factor based on acceptance rates for the distributed content.
Figure 4:
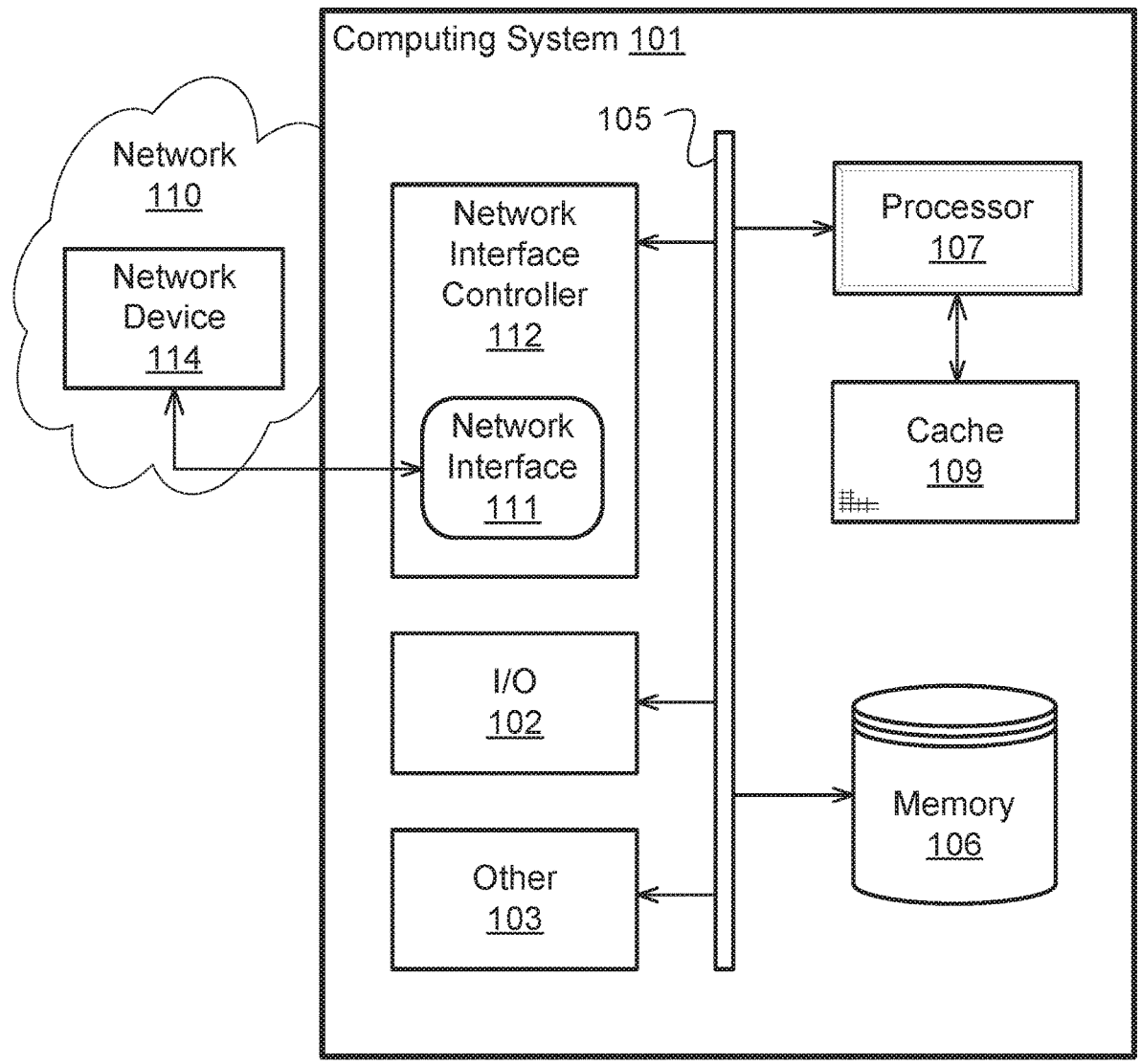
FIG. 4 is a block diagram of an example computing system suitable for use in the various implementations described.

FIG. 1 is a diagram of an example distribution system in a network environment 100 that includes a client device 120, a content selection server 140, a data manager 150, and a content server 170. The network environment 100 is referenced as an example environment for the different implementations described herein, including in the descriptions of FIGS. 2, 3A, and 3B. FIG. 2 is a flowchart of an example method 200 for responding to data requests. As described in more detail below, requests are allocated to response pools according to an allocation policy. The data requests may be, for example, requests for content. FIG. 3A, described in more detail below, is a flowchart of an example method 300 for distribution of the content item to an audience. The audience is divided into sub-groups, or audience pools, that each receive respective variations of the content item using different parameterization models. FIG. 3B, described in more detail below, is a flowchart of an example method 305 for determining a share or percentage of the audience for each audience pool. FIG. 4, described in more detail below, illustrates a computing device 101 that, in some configurations, is suitable for use as a client device 120, a content selection server 140, a data manager 150, and/or a content server 170.

In broad overview of FIG. 1, a client device 120 receives content via a network 110 from a content distribution platform 130. The illustrated content distribution platform 130 includes a content selection server 140 that selects a content item (or a variation of a content item) from data hosted by a data manager 150 for delivery to the client device 120 by a content server 170. The data manager 150 uses data storage devices 156 to store the content. As described in more detail below, the client device 120 is one of many client devices that obtain content from the content distribution platform 130. A group of client devices that receives the same content item (in one or more variations) forms an audience for that content item.

Referring to FIG. 1 in more detail, the network 110 enables communication between the client devices 120 and the content distribution platform 130. In some implementations, data flows through the network 110 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 110 layered over an OSI layer-3 network protocol such as Internet Protocol (IP), e.g., IPv4 or IPv6. The network 110 is composed of various network devices (nodes) linked together to form one or more data communication paths between participating devices. Each networked device includes at least one network interface for receiving and/or transmitting data, typically as one or more data packets. An illustrative network 110 is the Internet; however, other networks may be used. The network 110 may be composed of multiple connected sub-networks. The network 110 can be a local-area network (LAN) such as a company intranet, a metropolitan area network (MAN), a wide area network (WAN), an inter network such as the Internet, or a peer-to-peer network, e.g., an ad-hoc WiFi peer-to-peer network. The data links between nodes in the network 110 may be any combination of wired links (e.g., fiber optic, mesh, coaxial, twisted-pair such as Cat-5 or Cat-6, etc.) and/or wireless links (e.g., radio, satellite, microwave, etc.). The network 110 may include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including, but not limited to, so-called generation "3G," "4G," and "5G" protocols. The network may include short-range wireless links, e.g., via Wi-Fi, BLUETOOTH, or ZIGBEE, sometimes referred to as a personal area network (PAN) or mesh network. The network 110 may be public, private, or a combination of public and private networks. The network 110 may be any type and/or form of data network and/or communication network.

The client device 120 is a computing system, or processor-based device, that executes applications, presents output to a user, and receives input from the user. The client device 120 is capable of exchanging information with network nodes, computers, devices, and/or servers (e.g., the content selection server 140 and the content server 170) via the network 110. The client device 120 may be any kind of computing device, including, for example, a desktop computer, a laptop or notepad computer, a mobile device such as a tablet or electronic pad, a personal digital assistant, or a smart phone, a video gaming device, a television or television auxiliary box (also known as a "set-top box"), a kiosk, a hosted virtual desktop, or any other such device capable of exchanging information via the network 110. In some implementations, the client device 120 includes one or more hardware elements for facilitating data input and data presentation, e.g., a keyboard, a display, a touch screen, a microphone, a speaker, and/or a haptic feedback device. In some implementations, the client device 120 includes buttons, e.g., function-specific buttons (e.g., audio device volume controls such as volume up, volume down, mute, etc.) and/or function-agnostic buttons (e.g., a "soft" button that can be assigned specific functionality at a software level). In some implementations, the client device 120 includes a sensor capable of detecting movement of the client device 120 itself, e.g., an inertial measurement unit (IMU), an accelerometer, gyroscope, or tilt-sensor. An accelerometer may be a single-axis or multi-axis accelerometer. In some implementations, the client device 120 is implemented using special purpose logic circuitry, e.g., an application specific integrated circuit (ASIC). In some implementations, the client device 120 is implemented using a system on a chip (SoC) semiconductor device that includes at least one processor (or microprocessor) core. In some implementations, the client device 120 is implemented using a general purpose computing processor. FIG. 4, described in more detail below, illustrates a computing device 101 that, in some configurations, is suitable for use as a client device 120.

In some implementations, the client device 120 runs an operating system managing execution of software applications on the client device 120, including one or more software applications capable of presenting content received from content server 170. In some implementations, the operating system is provided with the client device 120. In some implementations, the client device 120 executes a browser application (e.g., a web browser) capable of receiving data formatted according to the suite of hypertext application protocols such as the Hypertext Transfer Protocol (HTTP) and HTTP encrypted by Transport Layer Security (HTTPS). In some such implementations, the browser facilitates interaction with the content distribution platform 130 in the form of one or more web pages. In some implementations, the browser application is provided with the client device 120. In some implementations, the client device 120 executes a custom application, e.g., a game or other application that interacts with the content distribution platform 130. Interactions between the custom application and the content distribution platform 130 may use standard protocols such as HTTP and HTTPS, or may use application-specific protocols, e.g., a custom application-layer protocol implemented over a transport-layer protocol such as UDP, TCP, or SCTP. In some implementations, the client device 120 includes a tool for obtaining and/or installing the custom application on the client device 120. In some implementations, one or more of the servers with which the client device 120 communicates supports a custom instruction set, e.g., an application programming interface (API), and the custom application executed on the client device 120 implements the API. An application can implement an API using, for example, a library or software development kit (SDK) provided to the application's developer.

In FIG. 1, the content distribution platform 130 is illustrated as a content selection server 140 and a content server 170 that collaborate to provide content from the data manager 150 to client devices 120 via the network 110. In some implementations, the functionality described in the content selection server 140 and the content server 170 are implemented together in a single back-end server. In some implementations, the functionality described in the content selection server 140 and the content server 170 is implemented across a number of computing devices, e.g., in a server farm or in a distributed content delivery network (CDN).

In some implementations, the content distribution platform 130 receives a request to provide a specific content item and, responsive to the request, the content selection server 140 directs the client device 120 to obtain the content from the content server 170. For example, in some implementations, the content selection server 140 generates a uniform resource locator (URL) addressing content made available via the content server 170. The content selection server 140 provides the URL to a client device 120, which in turn accesses the URL to obtain the identified content from the content server 170. The content server 170, responsive to the URL, obtains the content from the data manager 150 and provides it (serves it) to the client device 120. In some implementations, the content selection server 140 runs a service identifying content, e.g., third-party content, for presentation on the client device 120. In some implementations, the content selection server 140 uses a real-time selection process such as an automated auction to select a content item to provide to the client device 120. In some implementations, a variation of the selected content item is provided, where the variation is determined in accordance with a distribution model.

In some implementations, the content selection server 140 selects a variation of a specified content item. In some such implementations, the content item is modifiable responsive to one or more parameters. For example, the content item may have parameterized font options, font sizes, color options, background image options, language options, size options, scaling options, audio options, animation sequence options, and so forth. In some implementations, different variations of a content item are in different image file formats such as the JPEG, GIF, BMP, PNG, or TIFF image file formats. In some implementations, different variations differ in a quality level of the image file format, such that lower quality variations require less data to be transmitted to the client device. In some implementations, different variations of a content item vary in a color value, hue, contrast, brightness, saturation, and other color setting. The color value may be a red-green-blue (RGB) value, a cyan-magenta-yellow-key (CMYK) value, a Chroma-based "YCbCr" or "Y'CbCr" value, a PANTONE value, or a color value using any other color value scheme. In some implementations, the data manager 150 stores multiple variations of a content item, e.g., different pre-rendered variations of the same core content item. In some implementations, the content selection server 140 selects a variation from the set of variations.

In some implementations, the content selection server 140 uses a machine learning model to select a content variation, e.g., using parameterized options or selecting from a set of pre-generated content item variations. Under some machine learning techniques, a prediction model is used to estimate a performance metric and a content variation corresponding to the highest estimated performance metric may be selected for delivery to a client device. The machine learning model uses feedback information about a destination client device, or a user of a destination client device, to identify a variation that (in accordance with the machine learning model) is most likely to be accepted at the client device. Under machine learning techniques, a system uses a prediction model to estimate results for a performance metric and identifies a model output with a highest corresponding performance metric result. In some implementations, the content selection server 140 uses this approach to select a content variation corresponding to a predicted highest estimated acceptance and delivers the selected content variation to a client device.

In some implementations, the content selection server 140 uses a statistical model to select a content variation, e.g., using parameterized options or selecting from a set of pre-generated content item variations. In some implementations, the content selection server 140 uses a default or pre-selected variation in certain circumstances, e.g., when insufficient information is available to use one of the selection models.

Both machine learning modeling and statistical modeling techniques for content selection have strengths and weaknesses. With statistical modeling techniques, one advantage is that performance data for all content element configurations may be collected, as all are randomly selected and delivered. However, accumulating performance data for all configurations may take a significant amount of time. On the other hand, with machine learning techniques, one advantage is in predicting the best performing content element configuration a priori, without necessarily testing all possible configurations. However, in some instances, predictions using machine learning techniques may lead to selection of a less-than-optimal content element configuration, e.g., due to insufficient data or excess outlier data skewing parameters used in the machine learning model. Accordingly, the content distribution platform 130 balances content selection between different selection models. In some implementations, content selected by the content selection server 140 is third-party content.

The data manager 150 provides data storage and management services for persisting data in memory 156. The memory 156 may be implemented using one or more data storage devices. The data storage devices may be any memory device suitable for storing computer readable data. The data storage devices may include a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or BLU-RAY discs). Example implementations of suitable data storage devices include storage area networks (SAN), network attached storage (NAS), and redundant storage arrays.

The data manager 150 controls access to the memory 156. In some implementations, the data manager 150 hosts a query engine. In some implementations, the data manager 150 hosts a relational database, e.g., using a Relational Database Management System (RDBMS). In some implementations, the data manager 150 manages data in the memory 156 as files, e.g., XML files. In some implementations, the data manager 150 regulates access to data or features using credentials or account management utilities. In some such implementations, credential or account information is stored by the data manager 150 in the memory 156.

A database, or more specifically a database management system (DBMS), organizes data in accordance with a database definition, e.g., a database schema. In a basic relational database, the DBMS maintains data in a table-like data structure. Each table has columns, each corresponding to an entry type, classification, or purpose. For example, a table might have a column for numerical data, a column for text data (e.g., a description of the numerical data), a column for date data, and so forth. In a relational database, each entry in a column in a table is also in a row associating the entry with entries from other columns in the table. In some instances, an entry will associate a row from one table with one or more rows in another table. In some DBMS implementations, virtual tables called "views" represent data pulled from one or more tables as though it, too, were a table (that is, the view looks to a database client or user as though it was a table, but is not necessarily stored as such). Other types of database management systems can also be used, including various types of relational databases, object oriented databases, document oriented databases, XML databases, NoSQL databases, and so forth. Many of these database types use tables, or table-like structures, in a manner similar to that described above in reference to relational databases. A client or user of a database can add data to, modify data in, or retrieve data from the database using database instructions, e.g., queries in a database query language such as the Structured Query Language (SQL). One or more database instructions may be grouped together into a database transaction. Traditionally, a database provides transaction atomicity, consistency, isolation, and durability. These properties are known by the acronym "ACID." In some implementations, the data manager 150 provides a knowledge base with all of the ACID properties. However, in some implementations, the data manager 150 does not provide all of the ACID properties.

In some implementations, one or more of servers, e.g., the content selection server 140 and the content server 170, are in communication with the data manager 150, e.g., via a direct link or the network 110. In some implementations, one or more of the servers obtain data from the data manager 150 using queries in a formal query language such as Structured Query Language (SQL), Hyper Text Structured Query Language (HTSQL), Contextual Query Language (CQL), Data Mining Extensions (DMX), or XML Query (XQuery). In some implementations, one or more of the servers obtain data from the data manager 150 using an inter-process communication architecture such as the Common Object Request Broker Architecture (CORBA), Remote Procedure Calls (RPC), Object Linking and Embedding (OLE), Component Object Model (COM), or Distributed Component Object Model (DCOM). In some implementations, one or more of the servers obtain data from the data manager 150 using natural language or semantic queries. In some implementations, one or more of the servers obtain data from the data manager 150 using queries in a custom query language such as a Visualization API Query Language.

The content server 170 obtains a content item from the data manager 150 for delivery to the client device 120, e.g., responsive to an instruction from the content selection server 140. In some implementations, the content server 170 modifies a visual aspect of the obtained content item. In some such implementations, the content server 170 modifies or adjusts one or more color values, e.g., background color, font color, or a color designated for emphasis or underlining. In some implementations, the content server 170 modifies or adjusts a font used for presenting text in the content. In some such implementations, the content server 170 modifies or adjusts the font size, the font color, or whether the font is in a bold or italics mode. In some such implementations, the content server 170 modifies or substitutes images used in the content. For example, in some implementations, the content server 170 selects an image format from a set of image format options for the same visual image. In some implementations, the content server 170 selects an image size (or image file size), e.g., selecting smaller images for presentation at smaller client devices such as smart phones, selecting larger images for presentation at larger client devices such as laptop and desktop computers, selecting smaller file sizes for high latency and/or low bandwidth connections such as mobile phone network connections, and selecting larger file sizes for low latency and/or high bandwidth connections such as home or office broadband connections. The smaller images and smaller image files may be of lower visual quality than the corresponding larger images and larger image files, so it may be desirable to deliver the largest version that can be delivered in an acceptable amount of time with the resources available.

In some implementations, the content server 170 obtains a preformed variation of a content item from the data manager 150. The modifications or variations are responsive to instructions from the content selection server 140, which determines which variation of a content item is to be delivered. In some implementations, the content item, modified content item, or content item variant is then transmitted by the content server 170 to the client device 120 using a standard protocol such as UDP, TCP, or SCTP. In some implementations, the content item, modified content item, or content item variant is transmitted by the content server 170 to the client device 120 using a custom protocol. In some implementations, the content item, modified content item, or content item variant is transmitted by the content server 170 to the client device 120 in a unidirectional media stream such that a client device 120 passively receives the media stream without responding. In some implementations, the media stream is interactive such that a client device 120 has a means of responding to the content of the media stream, e.g., such that a source of the content of the media stream can be responsive to the interaction. That is, the content server 170 can further modify the content item responsive to instruction or feedback from the client device 120 mid-stream. For example, in some implementations, the content server 170 receives instructions from the client device 120 for modifying the media stream content and the content server 170 modifies or updates the stream content in accordance with the received instructions.

FIG. 2 is a flowchart of an example method 200 for responding to data requests. In broad overview of the method 200, beginning at block 210, a data processing system receives data requests from client devices. At block 220, the data processing system applies an allocation policy to assign the received data requests to respective response pools. For example, at block 230, the data processing system assigns a request to a response pool corresponding to a machine learning model and at block 235, the data processing system assigns a request to a response pool corresponding to a statistical model. Having assigned a request to the response pool corresponding to the machine learning model at block 230, the data processing system then selects, at block 240, a response to the request using the machine learning model and respond to the request, at block 250, with the selected response. Likewise, having assigned a request to the response pool corresponding to the statistical model at block 235, the data processing system then selects, at block 245, a response to the request using the statistical model and respond to the request, at block 255, with the selected response. At block 260, the data processing system obtains feedback information indicating a performance level of the machine learning model. At block 265, the data processing system obtains feedback information indicating a performance level of the statistical model. At block 270, the data processing system compares an aggregate performance level of the machine learning model to an aggregate performance level of the statistical model. This comparison may provide information about the accuracy of the machine learning model. At block 280, the data processing system updates the allocation policy, if necessary, responsive to the comparison. The method 200 continues to iterate, such that the data processing system continuously receives data requests from client devices at block 210, including after block 280.

Referring to FIG. 2 in more detail, at block 210, a data processing system receives data requests from client devices. In some implementations, the data processing system includes one or more physical servers. For example, the data processing system may be the content distribution platform 130 illustrated in FIG. 1 and described above. The method 200 is iterative, such that the data processing system continuously receives data requests from client devices at block 210. For example, the data processing system may receive a first plurality of data requests including at least a first data request from a first client device and a second data request from a second client device. The data processing system may respond to this first plurality of data requests as described herein, update an allocation policy at block 280, and subsequently receive a second plurality of data requests.

At block 220, the data processing system applies an allocation policy to assign the received data requests to respective response pools. In some implementations, the allocation policy allocates a first portion of the incoming data requests to a first response pool and a second portion of the incoming data requests to a second response pool. The first response pool may, for example, correspond to a machine learning model and the second response pool may correspond to a statistical model. In some implementations, there may be additional response pools, e.g., additional response pools each corresponding to respective alternative machine learning models. In some implementations, the allocation policy allocates the incoming data requests to response pools based, at least in part, on metadata corresponding to the requests, e.g., data indicating a respective history or source of each request. In some implementations, the allocation policy is a distribution factor. In some implementations, the allocation policy randomly, or pseudo-randomly, directs incoming requests to response pools. In some implementations, the allocation policy uses a deterministic allocation procedure. For example, in some implementations, the allocation policy causes the data processing system to apply a hash function to an incoming request (or a portion of an incoming request such as a request source information or a request packet header) and assign the request based on a result of the hash function modulo an apportionment value. For example, to direct 1/Nth of traffic to one pool, and the remainder to another pool, the allocation policy calculates, for each incoming request, a hash value modulo N and assigns requests with a result of zero to the first pool, and requests with a result greater than zero to the second pool. An apportionment value of two would result in two equal sized pools.

At block 220, the data processing system applies an allocation policy to assign the data requests received at block 210 to respective response pools. Blocks 230, 240, 250, and 260 relate to situations in which the data processing system assigns a data request to a response pool corresponding to a machine learning model. Blocks 235, 245, 255, and 265 relate to situations in which the data processing system assigns a data request to a response pool corresponding to a statistical model.

At block 230, the data processing system assigns a request to a response pool corresponding to a machine learning model. The data processing system assigns the request based on the application of the allocation policy at block 220, as described above. The data processing system uses a machine learning model to select a response to requests assigned to the response pool.

At block 240, the data processing system selects a response to the request using the machine learning model. In some implementations, the machine learning model selects responses to requests and is then improved based on feedback information obtained responsive to the selected responses. In some implementations, the machine learning model is a deep learning neural network.

At block 250, the data processing system responds to the request with the response selected at block 240. In some implementations, a data request is received from a client device 120 via a data network 110, and the data processing system responds to the request by transmitting the selected response to the client device 120 via the data network 110. In some implementations, the data processing system responds in a dedicated two-way communication channel. In some implementations, the data processing system responds by transmitting data to the requestor in an existing communication channel, e.g., an open TCP socket.

At block 235, the data processing system assigns a request to a response pool corresponding to a statistical model. The data processing system assigns the request based on the application of the allocation policy at block 220, as described above. The data processing system uses a statistical model to select a response to requests assigned to the response pool.

At block 245, the data processing system selects a response to the request using the statistical model. In some implementations, the statistical model selects responses to requests and is then improved based on feedback information obtained responsive to the selected responses. In some implementations, the statistical model is a clustering model.

At block 255, the data processing system responds to the request with the response selected at block 245. In some implementations, the data processing system responds in block 255 in the same manner described above in reference to block 250.

At block 260, the data processing system obtains feedback information indicating a performance level of the machine learning model. At block 265, the data processing system obtains feedback information indicating a performance level of the statistical model. In some implementations, the feedback information indicates a performance level of the respective model. For example, the feedback information may indicate an accuracy of the response, such as where the response is a prediction that can be compared to an actual outcome. For example, if the data request is a request for a navigable route, the prediction may be that a specific route will take X seconds to travel, and that X is less than the time required for alternative routes. The recipient may then travel the route and the length of time required can be measured. If the measured length of time is equal to X (or within a threshold range around X), then this indicates a level of accuracy for the prediction. If information is available for other travelers who take one or more of the alternative routes, the measured length of time can be compared to their respective travel times to verify whether X was indeed the fastest. In some implementations, the feedback information indicates utility of the response. For example, if a response is followed by a subsequent request in a brief window of time, this may indicate that the response had low utility. In some implementations, the data processing system measures the length of time between requests from a same source and, when the length of time is below a threshold, determines that the response was of low utility. In some implementations, a response may include data that can be actuated to generate a subsequent request (e.g., the response may include a hyperlink or URL). If the included data is actuated, this may indicate a higher level of utility. In some implementations, the data processing system identifies requests generated based on previous responses and determines that the previous response had a high level of utility.

In some implementations, the feedback information includes amount of time between delivering a response to a client device and receiving, from the client device, a subsequent data request. In some implementations, the feedback information includes a value included in the subsequent data request received, by the data processing system, from the client device. In some implementations, the feedback information includes a description received, by the data processing system from the client device, of an interaction with a presentation of the response at the client device. In some implementations, the feedback information includes identifying, by the data processing system, that a threshold length of time was exceeded without receiving any additional data requests from the client device.

At block 270, the data processing system compares an aggregate performance level of the machine learning model to an aggregate performance level of the statistical model. In some implementations, the comparison is used to determine whether the aggregate performance level of the statistical model exceeds the aggregate performance level of the machine learning model by at least a threshold. In some implementations, the data processing system determines, from this comparison, whether an update to the allocation policy is warranted. In some implementations, an update is warranted when the aggregate performance level of the statistical model exceeds the aggregate performance level of the machine learning model by at least a threshold. In some implementations, an update is warranted when the aggregate performance level of the machine learning model exceeds the aggregate performance level of the statistical model by at least a threshold.

At block 280, the data processing system updates the allocation policy responsive to the comparison. For example, in some implementations, where the aggregate performance level of the statistical model exceeds the aggregate performance level of the machine learning model by at least a threshold, the allocation policy is updated by the data processing system to reduce the portion of traffic flowing to the response pool that uses the machine learning model. This diverts some traffic away from an underperforming machine learning model. In some implementations, 90% or more, even 100%, of the traffic may be diverted away from the machine learning model in this manner. In some implementations, the data processing system updates the allocation policy by adjusting or altering an apportionment value or distribution factor. In some implementations, the data processing system updates the allocation policy by adding or removing response pool options. In some implementations, the data processing system updates the allocation policy by changing a percentage of traffic allocated to one or more response pools. In some implementations, the data processing system only updates the allocation policy when necessary, that is, when the comparison in block 270 indicates that the data processing system should do so.

The data processing system continues with the method 200, at block 210, using the updated allocation policy.

In some implementations, the data requests in FIG. 2 are for content, e.g., for an electronic document such as an e-book or webpage, or for portions of such a document such as an article, third-party content, an image, or a media file or stream. In some implementations, the requested content can be parameterized, i.e., customized or modified according to one or more parameters. In some implementations, a data server (e.g., a server in a content distribution platform 130, as illustrated in FIG. 1) parameterizes a content item responsive to incoming requests for the data item. In some such implementations, the data server allocates requests to different response pools based on an allocation policy that includes use of a distribution factor, where the data server parameterizes the content item differently for the different response pools. FIGS. 3A and 3B are flowcharts for an example of such content distribution. FIG. 3A is a flowchart 300 for distributing content variations based on a distribution factor and FIG. 3B is a flowchart 305 for updating the distribution factor based on acceptance rates for the distributed content.

Referring to FIG. 3A in broad overview, beginning at block 310, a content distribution platform 130 receives a request to deliver a content item to a client device 120. In some implementations, the request for the content item originates at the client device 120 and is received by a content selection server 140. At block 320, the content selection server 140 assigns the request to an audience pool based on a distribution factor. At block 330, the content selection server 140 determines whether the assigned audience pool uses a machine learning model for content selections, and, if so, at block 335 uses the machine learning model to select a variation of the requested content item for delivery. At block 340, the content selection server 140 determines whether the assigned audience pool uses a statistical model for content selections, and, if so, at block 345 uses the statistical model to select a variation of the requested content item for delivery. Otherwise, at block 348, the content selection server 140 identifies a preselected variation (e.g., a default variation) of the requested content item for delivery. At block 350, the content distribution platform 130 delivers the selected variation of the requested content item to the requesting client device. In some implementations, the content selection server 140 delivers, to the client device 120, an identifier (e.g., a URL) pointing to or describing the selected variation of the content item and the client device 120 provides the identifier to a content server 170 to obtain actual delivery of the content item.

Referring to FIG. 3A in more detail, beginning at block 310, a content distribution platform 130 receives a request to deliver a content item to a client device 120. In some implementations, the request for the content item originates at the client device 120 and is received by a content selection server 140. The request for the content item may specify a core content item, a variant of which will be delivered. For example, the request may be for a content item corresponding to an electronic document (e.g., a web page, an "e-book," a text file, a WORD file, a PUB file, etc.) that may be delivered in a variety of languages, using a variety of fonts and font sizes, accompanied by images in one or more different formats, sizes, and image qualities. Each variation of the electronic document is a distinct form of the content, but the actual material content remains consistent across the variations. In some implementations, the request is received in the form of an HTTP request, e.g., a URL. In some implementations, the request received does not specify a core content item, and the content distribution platform 130 selects a content item for use in satisfying the request.

For example, the request may be for a top news story and the distribution platform 130 identifies and selects a content item (e.g., a newspaper article or news broadcast video clip) corresponding to the top news story at that moment. The distribution platform 130 may identify the top news story as the content item most requested in a preceding sliding window of time, most requested within a geographic region, most requested in specific contexts or under similar parameters, and so forth. The distribution platform 130 may have multiple options available for how to select the content item, e.g., a first option based on a machine learning model and a second option based on a statistical model. In some implementations, the statistical model is more generalized and provides a broader consensus result as compared to the machine learning model. The options may result in selecting different content items for the same request. It is possible that a recipient of the selected content item would have preferred to receive the alternate option from the one selected. In such a circumstance, the accuracy of the selection model could have been better. As described in more detail below, the distribution platform 130 obtains feedback information that can indicate whether the recipient engaged with the delivered content item and/or requested different content, which can correspond to a quality of the selection.

At block 320, the content selection server 140 assigns the request to an audience pool based on a distribution factor. In some implementations, the assignment is deterministic—that is, under the same circumstances with the same distribution factor, the request will always be assigned to the same audience pool. In some implementations, the assignment is at random. In some implementations, the distribution factor is a percentage of the requests to be assigned to each pool. In some implementations, request information (e.g., one or more identifiers associated with the request source) is hashed and the resulting hash value is divided by the distribution factor to arrive at a pool identifier. In some instances, the distribution factor will thus cause a percentage of incoming requests to be placed in a first audience pool and another percentage of incoming requests to be placed in a second audience pool. The different pools may satisfy incoming content requests using different techniques, e.g., using different models for selecting content variations.

At block 330, the content selection server 140 determines whether the assigned audience pool uses a machine learning model for content selections, and, if so, at block 335 uses the machine learning model to select a variation of the requested content item for delivery. The machine learning model attempts to tailor content variations to a requesting entity. In some implementations, requests are classified by the content selection server 140 according to various parameters tied to the requests. For example, in some implementations, the content selection server 140 groups requests originating from a single source into a single class. In some implementations, the content selection server 140 groups requests originating from multiple sources into a single class based on source or request similarities. In some implementations, the content selection server 140 associates request sources with profiles and groups requests based on information in the profiles.

At block 340, the content selection server 140 determines whether the assigned audience pool uses a statistical model for content selections, and, if so, at block 345 uses the statistical model to select a variation of the requested content item for delivery. In some implementations of the statistical model, initially all possible variations of a content item are shown at random, in response to requests for that content item. A confidence interval is established for the acceptability of each variant of the content item to user—for example, if a content item is a webpage, a variant may be judged as unacceptable if the user requests another variant of that webpage, for example one with larger font sizes. With more traffic, the confidence interval for each variant becomes narrower. As soon as any particular variant is established to be confidently worse than the others based on the corresponding confidence interval, the statistical model demotes the particular variant. The statistical model continues to demote variants until only one variant remains. The remaining variant of the content item is then presented in exclusion to all other variants (except that a small portion of traffic may be used as an ongoing test-bed to continue to rotate all the losing variants of the content item to see if anything has changed over time, i.e., some traffic still receives a random variant to continue assessing acceptability). In this way, the cost of showing variants of content items that are known to be less acceptable to users than others is minimized. For example, one such statistical model is the "multi-armed bandit."

At block 348, the content selection server 140 identifies a preselected variation of the requested content item for delivery. For example, in some implementations, the content selection server 140 identifies a default version. In some implementations, the content selection server 140 identifies a baseline version. In some implementations, the content selection server 140 identifies a statistical control version of the content item.

At block 350, the content distribution platform 130 delivers the selected variation of the requested content item to the requesting client device. In some implementations, the content selection server 140 delivers, to the client device 120, an identifier (e.g., a URL) pointing to or describing the selected variation of the content item and the client device 120 provides the identifier to a content server 170 to obtain actual delivery of the content item.

Although the discussion of FIG. 3A is centered on content selection, in some implementations, the platform uses a machine learning model to make other decisions or recommendations. For example, in some implementations, the platform identifies channel preferences for a receiver such as a cable television station receiver, an over-the-air broadcast television station receiver, a network-streaming media receiver, a radio receiver, etc. The platform detects that the receiver is idle, e.g., because no station change has been made for a number of hours or because an attached presentation device (e.g., a television or other display device) is inactive and/or powered off. The platform periodically predicts which channel, from a plurality of channel options, the receiver should be tuned to if the attached presentation device were to be activated or powered-on, and the platform tunes the receiver to the predicted channel. If the attached presentation device is then activated, the platform receives feedback information in the form of whether the channel is left as predicted (indicating an accurate prediction) or changed (indicating a less accurate prediction). As another example, in some implementations, the platform identifies traffic obstacles and recommend navigable routes around the identified obstacles. Feedback information can be obtained by measuring actual travel time as compared to predicted travel time. In some implementations, access to multiple travelers allows for comparison between traffic left on the obstructed route to traffic routed around the identified obstruction. If the re-routed traffic is faster, this may indicate an accurate prediction. Other decisions or recommendations such as home automation settings, schedule alerts based on predicted travel time, natural language processing (e.g., speech to text), translation services, and so forth may similarly benefit.

FIG. 3B is a flowchart 305 for updating the distribution factor based on acceptance rates for the distributed content. Referring to FIG. 3B in broad overview, beginning at block 350, the content distribution platform 130 delivers the selected variation of the requested content item to the requesting client device. At block 360, the content distribution platform 130 obtains an acceptance indicator indicating recipient acceptance of the delivered variant of the requested content item. At block 370, the content distribution platform 130 updates values of an acceptance metric for the model used. At block 380, the content distribution platform 130 compares updated values of the acceptance metric for the machine learning model to updated values of the acceptance metric for the statistical model. At block 390, the content distribution platform 130 determines whether the machine learning model is underperforming. If so, at block 395, the content distribution platform 130 adjusts the distribution factor to lower the percentage of requests assigned to the audience pool that uses the machine learning model for selections. Otherwise the content distribution platform 130 may leave the distribution factor unchanged or, at block 399, adjusts the distribution factor to increase the percentage of requests assigned to the audience pool that uses the machine learning model for selections.

Referring to FIG. 3B in more detail, the flowchart 305 begins with block 350 from the end of the flowchart 300 shown in FIG. 3A. As previously described, at block 350, the content distribution platform 130 delivers a selected variation of a requested content item to a requesting client device.

At block 360, the content distribution platform 130 obtains an acceptance indicator indicating recipient acceptance of the delivered variant of the requested content item. In some implementations, a user may indicate acceptance of a delivered content item by interacting with the content item, e.g., clicking, tapping, or otherwise selecting an element of the content item. In some implementations, acceptance is indicated by the absence of rejection. That is, if a content item is fully delivered without a refresh or interruption, this may indicate acceptance. If, on the other hand, the client device submits another request for the same content item within a short window, or if delivery of the content item is interrupted, this may indicate that the content item was not accepted.

At block 370, the content distribution platform 130 updates values of an acceptance metric for the model used.

If the content item was selected for delivery using the machine learning model, then acceptance of the delivered content item (as indicated at block 360) is used to update an acceptance metric for the machine learning model. Likewise, if the content item was selected for delivery using the statistical model, then acceptance of the delivered content item (as indicated at block 360) is used to update an acceptance metric for the statistical model.

At block 380, the content distribution platform 130 compares updated values of the acceptance metric for the machine learning model to updated values of the acceptance metric for the statistical model. The content distribution platform 130 evaluates the metrics updated at block 370 to compare performance of the models with respect to acceptance. In some implementations, these statistics are stored by the data manager 150, e.g., in data storage 156.

At block 390, the content distribution platform 130 determines whether the machine learning model is underperforming. In general, the statistical model identifies a content variation that will be satisfactory under an assumption that all members of an audience have the same preferences. This "one size fits all" approach will work well for most—but not all—of the audience. Accordingly, the statistical model establishes a performance baseline. Ideally, the machine learning model, which can better tailor the variations to individual audience members or subgroups, will outperform the statistical model by identifying alternative variations that perform better with certain audience members than the generalized "one size fits all" variation. However, in some circumstances, the machine learning model will not outperform the statistical model. This may occur, for example, when the machine learning model has insufficient information or when the information is oversaturated with outlier data. In such circumstances, the impact of the machine learning model is reduced by limiting the audience share for the machine learning model. In some implementations, the content distribution platform 130 determines that the machine learning model is underperforming when the acceptance rate for content variations selected by the machine learning model is below a threshold minimum acceptance level. In some implementations, the content distribution platform 130 determines that the machine learning model is underperforming when the acceptance rate for content variations selected by the machine learning model is below the acceptance rate for content variations selected by the statistical model by at least a threshold margin.

If the content distribution platform 130 determines that the machine learning model is underperforming, then at block 395 the content distribution platform 130 adjusts the distribution factor to lower the percentage of requests assigned to the audience pool that uses the machine learning model for selections. While the machine learning model is underperforming the baseline, the lower acceptance rate of the variations selected by the machine learning model can be mitigated by directing a larger share of the overall audience to the baseline statistical model. By continuing to direct some of the audience to the machine learning model, the model may be improved by additional feedback. If the model continues to degrade, the audience share can be further reduced, e.g., to ten percent or even lower—all the way to zero, if the model is particularly bad. In some implementations, when the machine learning model is completely phased out, the content distribution platform 130 may reset the machine learning model with fresh data and restore its share of the audience. In some implementations, the content distribution platform 130 notifies an administrator or content source when the machine learning model has been phased out and/or reset. In some implementations, the extent to which the audience share is decreased is a preset increment. In some implementations, the decrement size is a function of how well the statistical model is out-performing the machine learning model.

If the content distribution platform 130 determines that the machine learning model is performing well, the content distribution platform 130 may leave the distribution factor unchanged or, at block 399, adjust the distribution factor to increase the percentage of requests assigned to the audience pool that uses the machine learning model for selections. In some implementations, the machine learning model must out-perform the statistical model by at least a threshold before the content distribution platform 130 increases the audience share for the machine learning model. In some implementations, the machine learning model must out-perform the statistical model for at least a threshold number of content distribution events or for a minimum length of time before the content distribution platform 130 increases the audience share for the machine learning model. In some implementations, the extent to which the audience share is increased is a preset increment. In some implementations, the increment size is a function of how well the machine learning model is out-performing the statistical model.

FIG. 4 is a block diagram of an example computing system 101. The example computing system 101 is suitable for use in implementing the computerized components described herein, in accordance with an illustrative implementation. In broad overview, the computing system 101 includes at least one processor 107 for performing actions in accordance with instructions and one or more memory devices 106 or 109 for storing instructions and data. The illustrated example computing system 101 includes one or more processors 107 in communication, via a bus 105, with memory 106, at least one network interface controller 112 and network interface 111 for connection to a network device 114 (e.g., for access to a network 110), and other components 103, e.g., input/output (I/O) components 102. Generally, a processor 107 will execute instructions received from memory (e.g., cache 109 or memory 106). For example, the illustrated processor 107 incorporates, or is directly connected to, cache 109. In some instances, instructions are read from memory 106 into cache 109 and executed by the processor(s) 107 from cache 109. In some implementations, instructions are encoded in read only memory (ROM), not shown. In some implementations, the client device 120 is implemented using a general purpose computing processor 107. In some implementations, the computing system 101 is implemented using special purpose logic circuitry, e.g., an application specific integrated circuit (ASIC). In some implementations, the computing system 101 is implemented using a system on a chip (SoC) semi-conductor device that includes the processor(s) 107 and one or more additional components, e.g., the network interface controller 112, cache 109, and hardware interfaces to I/O components 102.

In more detail, the processor(s) 107 may be any logic circuitry that processes instructions, e.g., instructions fetched from the memory 106 or cache 109. The computing system 101 may be based on any processor, or set of processors, capable of operating as described herein. The processor(s) 107 may be single core or multi-core processor(s). The computing system 101 may include multiple distinct processor(s) 107. For example, in some implementations, a general purpose processor 107 such as a central processing unit (CPU) may be augmented with one or more special purpose processors 107, such as a math co-processor or a graphics processing unit (GPU). In some implementations, the processor(s) 107 are implemented as circuitry on one or more "chips."

The memory 106 may be any device suitable for storing computer readable data. The memory 106 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto-optical disks, and optical discs (e.g., CD ROM, DVD-ROM, or BLU-RAY discs). A computing system 101 may have any number of memory devices 106.

The cache 109 is generally a form of computer memory placed in close proximity to a processor 107 for fast access times. In some implementations, the cache 109 is memory circuitry that is part of, or on the same chip as, a processor 107. In some implementations, there are multiple levels of cache 109, e.g., L2 and L3 cache layers. In some implementations, multiple processors 117, and/or multiple cores of a processor 117, share access to the same cache 109.

The network interface controller 112 manages data exchanges via the network interface 111 (sometimes referred to as a network interface port). The network interface controller 112 handles the physical and data link layers of the Open Systems Interconnection (OSI) model for network communication. In some implementations, some of the network interface controller's tasks are handled by one or more of the processor(s) 107. In some implementations, the network interface controller 112 is incorporated into the processor 107, e.g., as circuitry on the same chip. In some implementations, a computing system 101 has multiple network interfaces 111 controlled by a single controller 112. In some implementations, a computing system 101 has multiple network interface controllers 112. In some implementations, each network interface 111 is a connection point for a physical network link (e.g., a cat-5 Ethernet link). In some implementations, the network interface controller 112 supports wireless network connections and an interface 111 is a wireless (e.g., radio) receiver/transmitter (e.g., for any of the IEEE 802.11 WiFi protocols, near field communication "NFC", BLUETOOTH, BLE, ZIGBEE, ANT, or any other wireless protocol). In some implementations, the network interface controller 112 implements one or more network protocols such as Ethernet. Generally, a computing system 101 exchanges data with other computing devices via physical or wireless links through a network interface 111. The network interface 111 may link directly to another device or to another device via an intermediary device, e.g., a network device such as a hub, a bridge, a switch, or a router, connecting the computing system 101 to a data network 110 such as the Internet.

The computing system 101 may include, or provide interfaces for, one or more input or output (I/O) components 102. Input devices include, without limitation, keyboards, touch screens, microphones, foot pedals, inertial measurement units (IMU), accelerometers, gyroscopes, tilt-sensors, motion sensors, environmental sensors, Musical Instrument Digital Interface (MIDI) input devices, and pointing devices such as a mouse or trackball. Output devices include, without limitation, video displays, speakers, haptic feedback devices, refreshable Braille terminals, lights, servos, MIDI output devices such as MIDI synthesizers, and two or three dimensional printers (including, but not limited to, inkjet printers, laser printers, thermographic printers, stereolithographic printers, extrusion deposition printers, and metal sintering printers).

The other components 103 may include an I/O interface, external serial device ports, and any additional co-processors. For example, a computing system 101 may include an interface (e.g., a universal serial bus (USB) interface) for connecting input devices, output devices, or additional memory devices (e.g., portable flash drive or external media drive). In some implementations, a computing system 101 includes an additional device 103 such as a co-processor. For example, a math co-processor can assist the processor 107 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus (including, e.g., a processor 107). A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer-executable instructions, in a non-transitory form.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array (FPGA) or an application specific integrated circuit (ASIC). Such a special purpose circuit may be referred to as a computer processor even if it is not a general-purpose processor.

A user may opt in or out of allowing remote servers to identify and store information about the user and/or about devices operated by the user. For example, the user may opt in to receiving third-party content selected based on apparent relevance to the user. In some implementations, a device identifier is associated with a particular instance of a client application (e.g., running on client device 120). In some implementations, the user may be represented using a randomized device identifier (e.g., a cookie, a device serial number, etc.) that contains no personally-identifying information about the user. For example, information relating to the user's name, demographics, etc., may not be used by a remote server unless the user opts in to providing such information. Thus, the user has control over how information is collected about him or her and used by a remote server or other content source. Some information that may be associated with the user, or with an anonymized token representative of the user, may include events, such as one or more queries, one or more clicks, browser history data (e.g., the URLs visited, the number of URLs viewed, URL visit durations, etc.), etc.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A method comprising:
 receiving, by a data processing system including one or more servers, a request from a client device for a content item;
 assigning, by the data processing system, the received request to an audience pool based on a distribution factor, the audience pool selected for assignment from a set of audience pools including a first audience pool that receives content parameterized using a machine learning model and a second audience pool that receives content parameterized using a statistical model, and the distribution factor causing the data processing system to direct a first percentage of incoming requests to the first audience pool and a second percentage of incoming requests to the second audience pool;
 selecting, by the data processing system, a content variation responsive to the received request using a selection mode corresponding to the assigned audience pool, wherein
  when the received request is assigned to the first audience pool, the selection mode causes use of the machine learning model to select the content variation from among a first plurality of candidate content variations, and
  when the received request is assigned to the second audience pool, the selection mode causes use of the statistical model to select the content variation from among a second plurality of candidate content variations;
 transmitting, by the data processing system, the selected content variation to the client device;
 obtaining, by the data processing system, an acceptance indicator representing user interaction with the delivered content variation; and
 updating, by the data processing system, the distribution factor based on the obtained acceptance indicator and the assigned audience pool to direct different percentages of incoming requests to the first audience pool and the second audience pool and thereby balance content distribution based on performance of the machine learning model and the statistical model, wherein
  when the received request is assigned to the first audience pool, the updated distribution factor increases a percentage of the incoming requests directed to the first audience pool and decreases a percentage of the incoming requests directed to the second audient pool, and
  when the received request is assigned to the second audience pool, the updated distribution factor increases a percentage of the incoming requests directed to the second audience pool and decreases a percentage of the incoming requests directed to the first audient pool.

2. The method of claim 1, comprising:
 assigning the received request to the first audience pool; and
 selecting the content variation responsive to the received request, by the content distribution server, using the machine learning model.

3. The method of claim 1, comprising:
 assigning the received request to the second audience pool; and
 selecting the content variation responsive to the received request, by the content distribution server, using the statistical model.

4. The method of claim 1, comprising:
 determining that the obtained acceptance indicator, combined with previously collected acceptance data, indicates that an acceptance rate for content selected by the machine learning model is lower than an acceptance rate for content selected by the statistical model; and
updating the distribution factor to direct a decreased percentage of new requests to the first audience pool that receives content parameterized using the machine learning model.

5. The method of claim 1, wherein updating the distribution factor comprises directing future received requests away from the first audience pool.

6. A system comprising:
an interface to a data network;
a computing processor;
a computer readable memory storing instructions executable by the computing processor to:
receive a request from a client device for a content item;
assign the received request to an audience pool based on a distribution factor, the audience pool selected for assignment from a set of audience pools including a first audience pool that receives content parameterized using a machine learning model and a second audience pool that receives content parameterized using a statistical model, and the distribution factor causing the data processing system to direct a first percentage of incoming requests to the first audience pool and a second percentage of incoming requests to the second audience pool;
select a content variation responsive to the received request using a selection mode corresponding to the assigned audience pool, wherein
when the received request is assigned to the first audience pool, the selection mode causes use of the machine learning model to select the content variation from among a first plurality of candidate content variations, and
when the received request is assigned to the second audience pool, the selection mode causes use of the statistical model to select the content variation from among a second plurality of candidate content variations;
transmit the selected content variation to the client device;
obtain an acceptance indicator representing user interaction with acceptance of the delivered content variation; and
update the distribution factor based on the obtained acceptance indicator and the assigned audience pool to direct different percentages of incoming requests to the first audience pool and the second audience pool and thereby balance content distribution based on performance of the machine learning model and the statistical model, wherein
when the received request is assigned to the first audience pool, the updated distribution factor increases a percentage of the incoming requests directed to the first audience pool and decreases a percentage of the incoming requests directed to the second audient pool, and
when the received request is assigned to the second audience pool, the updated distribution factor increases a percentage of the incoming requests directed to the second audience pool and decreases a percentage of the incoming requests directed to the first audient pool.

7. The system of claim 6, the computer readable memory further storing
instructions executable by the computing processor to:
assign the received request to the first audience pool; and
select the content variation responsive to the received request using the machine learning model.

8. The system of claim 6, the computer readable memory further storing
instructions executable by the computing processor to:
assign the received request to the second audience pool; and
select the content variation responsive to the received request using the statistical model.

9. The system of claim 6, the computer readable memory further storing instructions executable by the computing processor to:
determine that the obtained acceptance indicator, combined with previously collected acceptance data, indicates that an acceptance rate for content selected by the machine learning model is lower than an acceptance rate for content selected by the statistical model; and
update the distribution factor to direct a decreased percentage of new requests to the first audience pool that receives content parameterized using the machine learning model.

10. The system of claim 6, wherein updating the distribution factor causes the computing processor to direct future received requests away from the first audience pool.

11. A non-transitory computer-readable medium storing instructions that cause a processor executing the instructions to:
receive a request from a client device for a content item;
assign the received request to an audience pool based on a distribution factor, the audience pool selected for assignment from a set of audience pools including a first audience pool that receives content parameterized using a machine learning model and a second audience pool that receives content parameterized using a statistical model, and the distribution factor causing the data processing system to direct a first percentage of incoming requests to the first audience pool and a second percentage of incoming requests to the second audience pool;
select a content variation responsive to the received request using a selection mode corresponding to the assigned audience pool, wherein
when the received request is assigned to the first audience pool, the selection mode causes use of the machine learning model to select the content variation from among a first plurality of candidate content variations, and
when the received request is assigned to the second audience pool, the selection mode causes use of the statistical model to select the content variation from among a second plurality of candidate content variations;
transmit the selected content variation to the client device;
obtain an acceptance indicator representing user interaction with the delivered content variation; and
update the distribution factor based on the obtained acceptance indicator and the assigned audience pool to direct different percentages of incoming requests to the first audience pool and the second audience pool and thereby balance content distribution based on performance of the machine learning model and the statistical model, wherein when the received request is assigned to the first audience pool, the updated distribution factor increases a percentage of the incoming requests directed to the first audience pool and decreases a percentage of the incoming requests directed to the second audient pool, and when the received request is assigned to the second audience pool, the updated distribution factor increases a percentage of the incoming requests directed to the second audience pool and decreases a percentage of the incoming requests directed to the first audient pool.

12. The computer-readable medium of claim 11, further storing instructions that cause
a processor executing the instructions to:
assign the received request to the first audience pool; and
select the content variation responsive to the received request using the machine learning model.

13. The computer-readable medium of claim 11, further storing instructions that cause
a processor executing the instructions to:
assign the received request to the second audience pool; and
select the content variation responsive to the received request using the statistical model.

14. The computer-readable medium of claim 11, further storing instructions that cause a processor executing the instructions to:
determine that the obtained acceptance indicator, combined with previously collected acceptance data, indicates that an acceptance rate for content selected by the machine learning model is lower than an acceptance rate for content selected by the statistical model; and
update the distribution factor to direct a decreased percentage of new requests to the first audience pool that receives content parameterized using the machine learning model.

15. The method of claim 1, wherein the machine learning model is a deep learning neural network trained on a supervised data set.

16. The method of claim 15, wherein the machine learning model is further trained based on feedback information received in response to outputs generated by the machine learning model.

17. The system of claim 6, wherein the machine learning model is a deep learning neural network trained on a supervised data set.

18. The system of claim 17, wherein the machine learning model is further trained based on feedback information received in response to outputs generated by the machine learning model.

* * * * *

UNITED STATES PATENT AND TRADEMARK OFFICE
CERTIFICATE OF CORRECTION

PATENT NO. : 12,073,292 B2
APPLICATION NO. : 16/322433
DATED : August 27, 2024
INVENTOR(S) : Sue Yi Chew et al.

Page 1 of 1

It is certified that error appears in the above-identified patent and that said Letters Patent is hereby corrected as shown below:

In the Claims

At Column 24, Line 45, "audient" should be -- audience --.

At Column 24, Line 51, "audient" should be -- audience --.

At Column 25, Line 46, "with acceptance of" should be -- with --.

At Column 25, Line 61, "audient" should be -- audience --.

At Column 25, Line 67, "audient" should be -- audience --.

At Column 27, Line 6, "audient" should be -- audience --.

At Column 27, Line 12, "audient" should be -- audience --.

Signed and Sealed this
Twenty-eighth Day of January, 2025

Coke Morgan Stewart
*Acting Director of the United States Patent and Trademark Office*